United States Patent [19]
Whitehouse et al.

[11] 3,795,879
[45] Mar. 5, 1974

[54] COMPOSITE DISPERSIVE FILTER

[75] Inventors: Harper John Whitehouse, San Diego, Calif.; Herman Van de Vaart, Harvard, Mass.

[73] Assignee: The United States of America as represented by the Secretary of the Navy, Washington, D.C.

[22] Filed: Apr. 4, 1973

[21] Appl. No.: 347,748

[52] U.S. Cl. .................... 333/72, 310/9.8, 333/30 R
[51] Int. Cl. ........ H01v 7/00, H03h 9/26, H03h 9/30
[58] Field of Search ... 333/30 R, 71, 72; 310/8, 8.1, 310/9.4, 9.7, 9.8

[56] References Cited

OTHER PUBLICATIONS

Court–Microwave Acoustic Devices for Pulse Compression Filter in IEEE Trans. on Microwave Theory and Techniques Vol. MTT 17, No. 11 Nov. 1969; pp. 968–986.

*Primary Examiner*—Archie R. Borchelt
*Assistant Examiner*—Marvin Nussbaum
*Attorney, Agent, or Firm*—Richard S. Sciascia; Ervin E. Johnston; John Stan

[57] ABSTRACT

A surface-wave device upon whose surface an acoustic wave may be made to propagate by the transduction of an electrical signal, which may be applied to the input of the device, comprising a substrate capable of propagating an acoustic surface wave and a conductive structure disposed upon the substrate. The conductive structure includes at least two pairs of sets of linear electrodes, an input pair and an output pair, one set of each pair being interdigitated with the other set of the same pair; and a pair of bus bars connected to opposite ends of the sets of electrodes, one bus bar for each set of electrodes of the input pair and output pair. The spacing between any two adjacent electrodes of the input pair and of the output pair of sets of electrodes varies in a prescribed manner, the spacing of the output pair being a mirror image of the input pair, the unequal spacing causing a modification of the propagation characteristics of the acoustic wave. A layer of material capable of propagating an acoustic wave is chosen and disposed upon the propagating structure, the layer being disposed at least between the input and output pairs of sets of electrodes. The linear spacing of the electrodes is modified in such a manner as to compensate for the progagation characteristics of the chosen dispersive material subsequently disposed upon the electrodes, resulting in a surface wave device having a larger time-bandwidth product and pulse compression ratio than in a device not including both complementary features.

6 Claims, 10 Drawing Figures

TRANSDUCER DEVICE WITH LINEAR DISPERSION CHARACTERISTICS

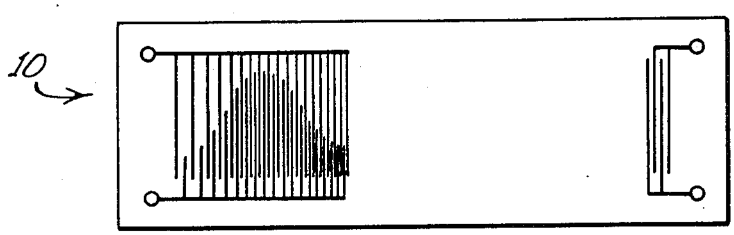
FIG. 1. (PRIOR ART)
DISPERSIVE DELAY LINE USING A WEIGHTED TRANSDUCER.
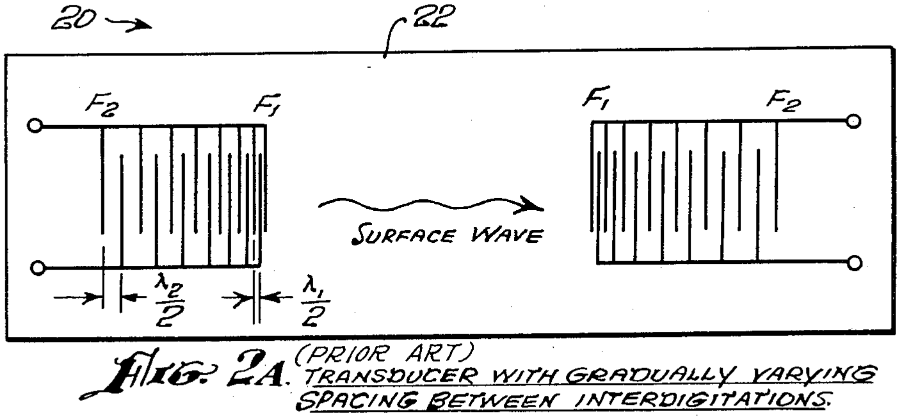
FIG. 2A. (PRIOR ART) TRANSDUCER WITH GRADUALLY VARYING SPACING BETWEEN INTERDIGITATIONS.
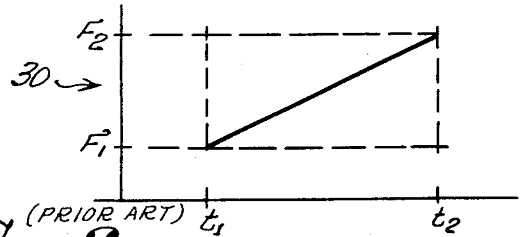
FIG. 2B. (PRIOR ART) CURVE OF FREQUENCY VERSUS TIME DELAY.
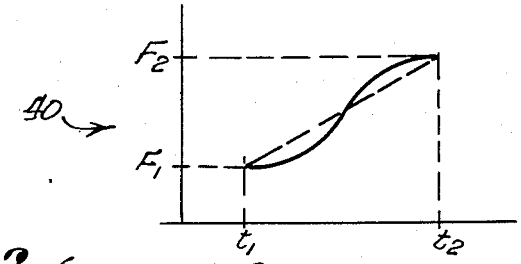
FIG. 3. (PRIOR ART) RESPONSE CURVE FOR UNIFORMLY SPACED TRANSDUCER WITH LAYER OVER SUBSTRATE.

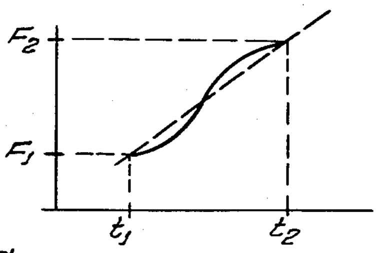
FIG. 4A. - DISPERSION DUE TO LAYERED SUBSTRATE.
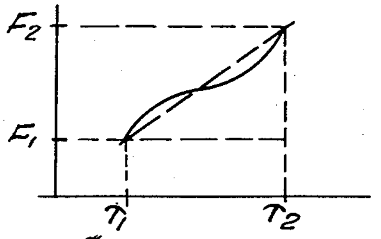
FIG. 4B. - DISPERSION DUE TO SPACING OF INTERDIGITATIONS.
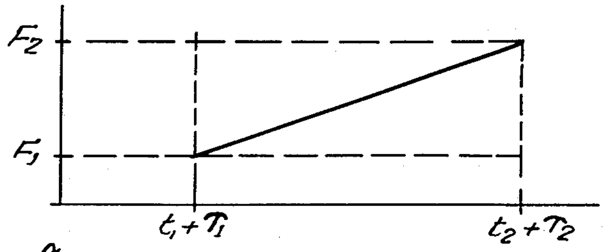
FIG. 4C. COMPOSITE DISPERSION DUE TO LAYERED SUBSTRATE AND SPACING OF INTERDIGITATIONS.
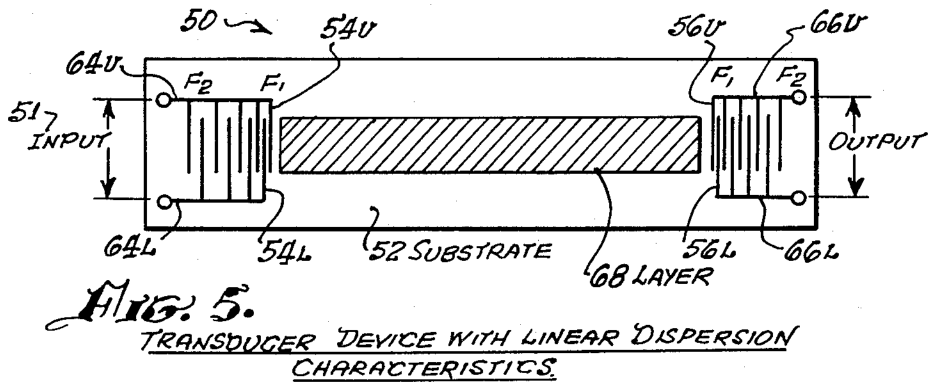
FIG. 5.
TRANSDUCER DEVICE WITH LINEAR DISPERSION CHARACTERISTICS.

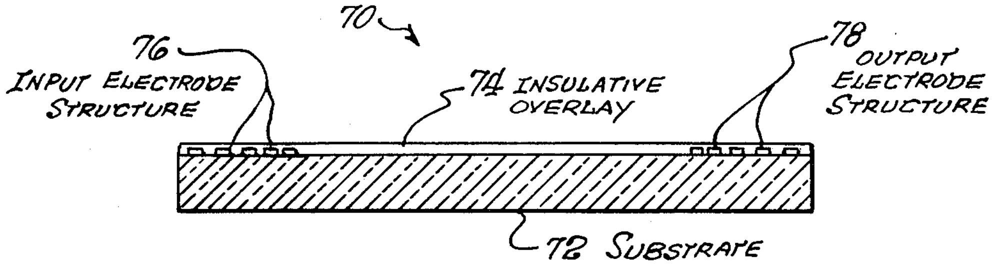
FIG. 6.
COMPOSITE DISPERSIVE TRANSDUCER DEVICE WITH INSULATING OVERLAY
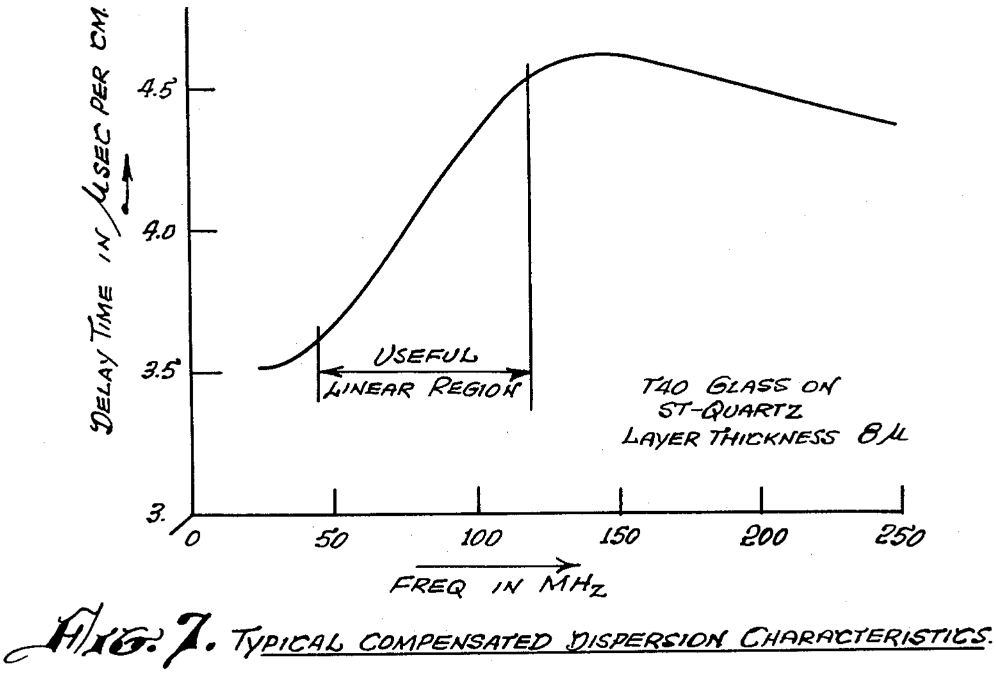
FIG. 7. TYPICAL COMPENSATED DISPERSION CHARACTERISTICS.

COMPOSITE DISPERSIVE FILTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Modern radar systems are becoming increasingly dependent on sophisticated signal processing techniques for improved range, range solution and target identification. Substantial improvements in system performance can be achieved by the use of a linear FM waveform and a pulse-compression filter. In the prior art, several techniques have been used for obtaining the dispersive delay function required to perform pulse compression, such as lumped-constant networks, dispersive metal strip ultrasonic delay lines and folded tape meander lines. However, these devices are either limited to frequencies below 100 MHz, or are rather bulky in size.

It has recently been shown that an extremely efficacious means of obtaining both dispersive and non-dispersive delay in the microsecond range is to use elastic surface waves, generated on the surface of a substrate. Unlike bulk acoustic waves, the elastic energy is concentrated near the surface, and hence can be easily manipulated to perform a variety of functions. The surface waves can most conveniently be generated by means of an interdigital transducer. Such a transducer consists of two arrays of metal strips, which resemble interleaved fingers, adjacent fingers being placed a half wavelength apart on the substrate, for example, a piezoelectric substrate. An r-f signal impressed on the electrodes produces an alternating strain which propagates along the surface of the crystal, through the piezoelectric properties of the substrate.

Elastic surface wave dispersive filters can be obtained by two distinctly different means.

1. In the first means, the interdigital transducer itself can be made dispersive, in two different ways:

(1*a*) In the first way, as shown in FIG. 1, the input interdigital transducer, at the left, can have one set, of a pair of sets, of electrodes of varying lengths, that is, have a set of weighted electrodes, as well as have the pair of sets of electrodes of varying spacing;

(1*b*) The second way in which the interdigital transducer itself can be made dispersive is by making the transducer finger spacing graded, such that one side of the array generates a surface wave at $F_1$, while the other end generates a surface wave at $F_2$, as is shown in FIG. 2A. A similar transducer, shown at the right, which is a mirror image of the first one, is used to detect the signal. It is easily seen that the time delay vs frequency characteristic is as shown in FIG. 2B, assuming a linear grading in the finger spacing. A desired nonlinear time delay vs frequency response can be obtained by appropriately grading the transducer finger spacing. The prior art dispersive interdigital transducers shown in FIG. 2A are limited to ~30 percent relative bandwidth, due to excessive generation of spurious modes. For a given frequency band, they are also limited in the delay variation. This is due to the fact that the number of interdigital finger pairs is given by $F_o\Delta T$, where $F_o$ is the center frequency, and $\Delta T$ the time delay variation, and, for $F_o\Delta T$ exceeding a few thousand, the surface loading becomes excessive, with resulting signal degradation.

2. The second distinctly different means by which an elastic surface wave dispersive filter can be obtained is by placing a thin layer on the substrate. The surface wave propagation is then dispersive, i.e., a surface wave at frequency $F_1$ has a different propagation velocity from a surface wave at frequency $F_2$. In theory, a very large relative bandwidth can be obtained, and the time delay is only limited by the size of the crystal and the propagation losses. However, dispersive delay lines of this type, when the interdigitations are uniformly spaced, have one major disadvantage: their time delay vs frequency behavior is inherently nonlinear, as may be seen in FIG. 3. This is unattractive for pulse expansion and compression devices. In addition, it is difficult to construct an effective wide-bandwidth transducer.

SUMMARY OF THE INVENTION

This invention relates to a surface-wave device comprising a substrate capable of propagating an acoustic surface wave and a conductive structure disposed upon the substrate, comprising two pairs of sets of interdigitated linear electrodes, and a pair of bus bars connected to opposite ends of the sets of electrodes. A material which is to be used as an overlay is chosen in advance. The spacing between any two adjacent electrodes of the sets of electrodes is then varied in a prescribed manner, the spacing of the output pair being a mirror image of the input pair, the unequal spacing causing a modification of the propagation characteristics of the acoustic wave. The layer of material, which is capable of propagating an acoustic wave, is disposed upon the propagating structure at least between the input and output pairs of sets of electrodes, the linear spacing of the electrodes modifying the propagation characteristics of the acoustic wave in a manner which complements the modification due to the overlay of material.

OBJECTS OF THE INVENTION

An object of the invention is to provide a composite dispersive filter which can handle frequencies much higher than prior art devices.

Another object of the invention is to provide a composite dispersive filter which combines the advantages of two other types of prior art dispersive filters.

Still another object of the invention is to provide a composite dispersive filter which is less bulky than prior art devices.

Other objects, advantages and novel features of the invention will become apparent from the following detailed description of the invention, when considered in conjunction with the accompanying drawings, wherein:

BRIEF DESCRIPTION OF THE DRAWINGS

FIG. 1 is a diagrammatic view of a prior art dispersive delay line using weighted electrodes in the input transducer.

FIG. 2A is a diagrammatic view of another type of prior art dispersive delay line, while FIG. 2B is a curve of its response.

FIG. 3 is a curve showing a typical response of a prior art uniformly spaced transducer with a layer over the substrate.

FIGS. 4A, 4B and 4C are a set of three graphs, showing in parts (A) and (B) respectively the dispersion due to the presence of a layer on the substrate and due to the unequal spacing of the interdigitations, and in part (C) a composite curve of both dispersions.

FIG. 5 is a diagrammatic view of one embodiment of the composite dispersive filter of this invention.

FIG. 6 is a diagrammatic view of another embodiment of the composite dispersive filter of this invention.

FIG. 7 is a graph showing typical compensated dispersion characteristics.

DESCRIPTION OF THE PREFERRED EMBODIMENTS

As may be seen from the three curves, FIGS. 4A, 4B and 4C, wherein is shown a synthesis of an ideal response curve, the solution to obtaining a linear dispersion and an increase in time delay is to combine the features of the two kinds of dispersive filters.

The nonlinear time delay vs frequency characteristic, shown in FIG. 4A, inherent in the layered structure, can be compensated by appropriate non-linear grading, shown in FIG. 4B, of the interdigital transducer. The curve of the composite dispersion is shown in FIG. 4C.

The complete composite structure would appear as shown in FIG. 5. The layer, if nonconductive, may extend over the transducers; this does not change the principle of the device.

As may be seen by a comparison of the three curves FIGS. 4A, 4B and 4C, the time delay variation of the composite structure has been increased by $\tau_2-\tau_1$, compared to the time delay of the interdigital dispersive transducers, without increasing the number of interdigital finger pairs. Thus a large time-bandwidth product and a larger pulse compression ratio are obtained than for each dispersive filter individually.

The signal generation by means of the dispersive interdigital transducer is more effective than could be obtained in the non-layered structure.

Typically, the dispersive filters of this invention are useful for frequencies in the range of 50 MHz to 500 MHz.

Referring now to FIG. 5, this figure shows a surface-wave device 50 upon whose surface an acoustic wave may be made to propagate by the transduction of an electrical signal, which may be applied to the input 51 of the device, comprising a substrate 52 capable of propagating an acoustic surface wave. A conductive structure disposed upon the substrate comprises two pairs of sets of linear electrodes, an input pair, 54U and 54L, and an output pair, 56U and 56L, one set of each pair interdigitated with the other set of the same pair. A pair of bus bars is connected to opposite ends of the sets of electrodes, one bus bar, 64U and 64L, for each set of electrodes of the input pair, 54U and 54L, and another bus bar, 66U and 66L, for each set of electrodes of the output pair, 56U and 56L. The spacing between any two adjacent electrodes of the input pair, 54U and 54L, and of the output pair of sets of electrodes, 56U and 56L, varies in a non-linear manner, the spacing of the output pair being a mirror image of the input pair.

The surface wave device 50 further comprises a layer of material 68 capable of propagating an acoustic wave, disposed upon the substrate 52 at least between the input and output pairs of sets of electrodes, 54U, 54L, and 56U, 56L, the layer modifying the propagation characteristics of the acoustic wave in a manner which complements the modification due to the linear spacing of the electrodes, resulting in a surface wave device having a larger time-bandwidth product and pulse compression ratio than in a device not including both complementary features.

In the surface-wave device 50 shown in FIG. 5, the substrate 52 may be a piezoelectric material, and the layer of material 68 may be gold in the range of $10\mu$ microns thick, the layer of course not touching the electrode structure when it comprises a conductive material. The thickness of the layer of gold is a function of the type of dispersion one wishes to obtain via design curves which have been published, and is determined by the required design parameters. Any thickness, for example in the range of 10 microns, can be chosen for the layer, and then a corresponding interdigital spacing for the transducers may be chosen, from tabulated charts or curves. For example, see the article entitled "Elastic Surface Waves Guided by Thin Films," by H. F. Tiersten, which appeared in the February 1969 issue of the Journal of Applied Physics, Volume 40, Number 2.

The substrate need not be crystalline, however, it must be capable of propagating an acoustic surface wave. FIG. 6 shows a composite dispersive transducer device 70 different in construction from the transducer device 50 shown in FIG. 5. The surface-wave device 70 comprises a substrate 72 which may be a non-crystalline material, and further comprises a layer of insulative overlay 74 in the form of a piezoelectric material disposed over and between the input and output electrode structures, 76 and 78. A typical piezoelectric material is cadmium sulfide.

The specific type of film to be used as an overlay 74 has been described in the prior art. The film chosen must be compatible with the substrate 72. For any combination of film 74 and substrate 72 there is a definite dispersion curve, and for that dispersion curve one can construct a nonuniform transducer structure 76 and 78 which will exactly compensate for it, to obtain optimal results.

A typical conductive film 68 would be gold on fused silica or gold on quartz. Alternatively, a nonconductive layer of silicon monoxide may be used, or magnesium fluoride, or any low-loss material whose velocity of propagation is different from the velocity of propagation of the substrate.

A typical material for the substrate may be lithium niobate or lithium tantalate.

FIG. 7 shows a plot of delay time vs frequency for an $8\mu$ thick layer of T40 glass on ST-cut quartz, for a propagation path of 1 cm. Thus, for instance, the delay time varies from 3.6 $\mu$sec to 4.6 $\mu$sec when the frequency is varied from 45 MHz to 120 MHz. The dispersion is non-linear, as is obvious, but a closed form expression for the curve is not shown but may be obtained by conventional methods. The points on the curve shown are computer calculated from $6 \times 6$ matrix.

In the embodiments 50 and 70 of this invention a binary coding is not used but rather a phase coding, a nonuniform phase coding, to compensate for the phase dispersion caused by the presence of the film on the substrate.

The spurious mode generation which limits the amount of bandwidth of the interdigitated transducers, having no overlay, and hence the reason one has to go to the composite dispersive filter is due to the fact that the fingers of the transducer at one set of spacings, say the λ/2 corresponding to the high-frequency $F_1$ acts as a diffraction grating to the sound frequencies which have already been generated by the transducer elements or fingers with the larger spacing. And this grating, as in the optical case, takes and diffracts the sound out of the surface, and it may be determined that coherent generation of shear waves is produced in the transducer. These shear waves carry off a significant amount of the transducer's energy.

Obviously many modifications and variations of the present invention are possible in the light of the above teachings. It is therefore to be understood that within the scope of the appended claims the invention may be practiced otherwise than as specifically described.

What is claimed is:

1. A surface-wave device upon whose surface an acoustic wave may be made to propagate by the transduction of an electrical signal, which may be applied to the input of the device, comprising:

a substrate capable of propagating an acoustic surface wave;

a conductive structure disposed upon the substrate, comprising:

two pairs of sets of linear electrodes, an input pair and an output pair, one set of each pair interdigitated with the other set of the same pair; and a pair of bus bars connected to opposite ends of the sets of electrodes, one bus bar for each set of electrodes of the input pair and output pair; wherein the spacing between any two adjacent electrodes of the input pair and of the output pair of sets of electrodes varies in a linear manner, the spacing of the output pair being a mirror image of the input pair, the unequal spacing causing a modification of the propagation characteristics of the acoustic wave; and a layer of material capable of propagating an acoustic wave disposed upon the substrate, the layer disposed at least between the input and output pairs of sets of electrodes, the layer modifying the propagation characteristics of the acoustic wave in a manner which complements the modification due to the linear spacing of the electrodes, resulting in a surface wave device having a larger time-bandwidth product and pulse compression ratio than in a device not including both complementary features.

2. The surface-wave device according to claim 1, wherein the substrate is a piezoelectric material; and the layer of material is gold in the range of 10$\mu$ microns thick, the layer not touching the electrode structure.

3. The surface-wave device according to claim 1, wherein the substrate is a non-crystalline material; and further comprising:

a layer of piezoelectric material disposed over and between the input and output electrode structures.

4. The surface wave device according to claim 3, wherein the piezoelectric material is cadmium sulfide.

5. The surface-wave device according to claim 1, further comprising:

a layer of ferroelectric material disposed over and between the input and output electrode structures.

6. The surface-wave device according to claim 5, wherein the ferroelectric material is barium titanate.

* * * * *